United States Patent
Kessler et al.

(10) Patent No.: US 6,430,638 B1
(45) Date of Patent: Aug. 6, 2002

(54) THREAD SYNCHRONIZATION VIA SELECTIVE OBJECT LOCKING

(75) Inventors: Peter B. Kessler, Palo Alto; Mark B. Reinhold, Menlo Park, both of CA (US); Duncan Stuart Ritchie, Vancouver (CA)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/885,566

(22) Filed: Jun. 30, 1997

(51) Int. Cl.$^7$ .................................................. G06F 9/46
(52) U.S. Cl. ..................... 710/200; 709/102; 709/104
(58) Field of Search .............................. 709/100, 107; 710/200; 700/100

(56) References Cited

U.S. PATENT DOCUMENTS

| | | | | |
|---|---|---|---|---|
| 4,716,528 A | * | 12/1987 | Crus et al. ................... | 364/300 |
| 5,136,712 A | * | 8/1992 | Perazzoli, Jr. et al. ...... | 395/700 |
| 5,414,839 A | * | 5/1995 | Joshi .......................... | 395/600 |
| 5,430,860 A | * | 7/1995 | Capps, Jr. et al. .......... | 395/425 |
| 5,832,484 A | * | 11/1998 | Sankaran et al. ............. | 707/8 |

OTHER PUBLICATIONS

"A Lock Method for KBMS: Using Abstraction Relationship' Semcatics", Fernando de Ferreiro Rezencde, 1994.*

"Aries: A Transaction Recovery Method Supporting Five-Gronulonly locking and Partial Rollbacks using Write-Ahead Loggin" C Mohan, 1992.*

"Locking Performance in Centralized Database" Y.C. Tay, 1985.*

Doug Lea and David Holmes, "Design Patterns for Concurrent Programming A Java Example," 1997.

Pedro Diniz and Martin Rinard, Department of Computer Science, University of California, Santa Barbara; "Lock Coarsening: Eliminating Lock Overhead in Automatically Parallelized Object–Based Programs"; Aug. 1996.

* cited by examiner

*Primary Examiner*—Majid Banankhah
(74) *Attorney, Agent, or Firm*—McDermott, Will & Emery

(57) ABSTRACT

A method and apparatus for providing selective object locking is provided. First, a lock object is designated. The identity of the lock object is then made available to objects in an object calling hierarchy. The first object invoked by the calling thread obtains a lock on the lock object to protect data associated with the first invoked object. Other objects in the object calling hierarchy can relock the lock object to protect their data. The invention also provides for selective object locking by providing the capability for a calling thread to specify that no object locking is to be preformed, which causes objects invoked by the calling thread to not perform object locking.

33 Claims, 6 Drawing Sheets

THREAD SYNCHRONIZATION VIA SELECTIVE OBJECT LOCKING

FIELD OF THE INVENTION

The invention relates to multi-threaded computing environments, and more specifically, to a method and apparatus for synchronizing threads via selective object locking.

BACKGROUND OF THE INVENTION

Multi-threaded computing environments allow different parts of a program, known as threads, to execute simultaneously. In recent years, multithreaded computing environments have become more popular because of the favorable performance characteristics provided by multithreaded applications.

Compared to the execution of processes in a multiprocessing environment, the execution of threads may be started and stopped very quickly because there is less runtime state to save and restore. The ability to quickly switch between threads can provide a relatively high level of data concurrency. In the context of a multi-threaded environment, data concurrency refers to the ability for multiple threads to concurrently access the same data. When the multi-threaded environment is a multi-processor system, each thread may be executed on a separate processor, thus allowing multiple threads to access shared data simultaneously.

Despite the favorable performance characteristics provided by multithreaded computing environments, they are not without their disadvantages. Specifically, in multi-threaded applications, maintaining the integrity of data structures and variables can be particularly challenging since more than one thread can access the same data simultaneously. Unlike processes in multiprocessing environments, threads typically share a single address space and a set of global variables and are primarily distinguished by the value of their program counters and stack pointers. Consequently, the state of some commonly accessible data can be undergoing a change by one thread at the same time that it is being read by another thread, thus making the data unreliable.

To control access to common data by multiple threads, some systems synchronize or serialize the access to common data by threads. In the context of multithreaded environments, synchronizing threads refers to employing a mechanism to control the access to common data structures so that only one thread can access a common data structure at any given time. Typically, multiple requests to access common data are queued and then serviced one at a time, either by an operating system, multi-threaded system, or some other mechanism.

To synchronize threads, some programming languages include a programming language construct known as a "monitor." A monitor provides encapsulation of variables, methods and other types of data within an abstract data type. A monitor's variables, methods and other data may only be accessed through a single access procedure, which ensures that only one thread may be actively accessing the monitor at any one time, with other access requests being queued until it is their turn. Other programming languages support a "synchronized" statement which, when executed by a thread, effectively locks a block of code, so that only the thread which executed the synchronized statement can execute the locked block of code. Code which affects common data is then placed in a synchronized block of code so that only one thread may access the common data at any given time.

In object oriented environments thread synchronization is sometimes achieved through object locking. In general, object locking involves locking data associated with an object so that only the thread that invoked the methods associated with the object may cause changes to the data associated with the object. Because of the inherent reusability of object oriented languages, it is common for software developers to build large reusable object class libraries. Since library developers do not always know ahead of time how these object class libraries will be used, object locking is typically implemented for every object in the library.

Although object locking does prevent more than one thread from accessing data at the same time, in some circumstances object locking is unnecessary. For example, some applications employ only a single thread, which eliminates the concern that more than one thread will access object data simultaneously. Even for multithreaded applications, often data may be protected with thread safety mechanisms provided by an operating system or at a higher level by a multithreaded environment. In both of these situations, none of the objects in an object calling hierarchy need to be locked. Consequently, the time and system resources expended during the automatic execution of lock-related operations is wasted.

Invoking a high level object may cause large numbers of objects to be locked, since the invoked object may invoke another object, which itself may invoke another object. There is no theoretical limit to the depth of a calling hierarchy. Consequently, there is no limit to the time wasted by built-in lock operations when locking operations are not necessary. Locking an object can require significant system resources and time. For example, in some systems, obtaining a lock on an object requires that a first lock be obtained on a lock table and then a lock table entry constructed based upon information about the thread which is to obtain the lock.

Consider the object calling hierarchy 100 illustrated in FIG. 1. Dynamic calling hierarchy 100 includes object A 102, object B 104 and object C 106. Object A 102 includes data 108, such as variables and data structures associated with object A 102. Object A 102 also includes a method 110 which operates on data 108. Similarly, object B 104 includes data 112, such as variables and data structures associated with object B 104. Object B 104 also includes a method 114 which operates on data 112. Finally, as with object A 102 and object B 104, object C 106 includes data 116, such as variables and data structures associated with object C 106. Object C 106 also includes a method 118 which operates on data 116.

As illustrated by the object calling hierarchy 100 of FIG. 1, invoking method 110 of object A 102 causes method 114 of object B 104 to be invoked, which in turn causes method 118 of object C 106 to be invoked.

In a multithreaded environment, more than one thread (not illustrated) may invoke method 110, 114, 116 associated with objects 102, 104, 106, respectively. Furthermore, if these threads are unsynchronized, data 108, 112, 116 may be updated by more than one thread, making data 108, 112 and 116 unreliable.

According to a typical synchronization approach, when method 110 is invoked, the execution of code 120 causes a lock to be obtained on a lock object A 122, contained in data 108. Once lock object A 122 has been locked, only the thread which holds lock object A 122 can cause changes to occur to data 108. Specifically, since method 110 also includes code 123 for accessing data A 124 contained in data 108, only the thread which holds lock object A 122 can cause code 123 to be executed and cause changes to data A 124.

Invoking method 110 also causes the execution of code 125 which invokes method 114 of object B 104. Invoking method 114 causes a lock to be obtained on a lock object B 126 via the execution of code 128. Then, the execution of code 130 causes method 118 of object C 106 to be invoked. The execution of code 134 then causes a lock to be obtained on lock object C 132.

Method 118 includes code 135 which accesses data C 136 in data 116. Method 118 also includes code 137 which causes the release of the lock on lock object C 132. Control is then returned to method 114, where code 138 accesses data B 139 in data 112. Then the lock on lock object B 126 is released via the execution of code 140 and control is returned to method 110. Finally, the execution of code 142 causes the release of the lock on lock object A 122.

Although the built-in locking code 120, 142, 128, 140, 134, 137 ensures that only one thread will access data 108, 112, 116 at any given time, it requires three lock operations and three unlock operations. In some situations, locking and unlocking all three lock objects 122, 126, 132 is not necessary. For example, a single threaded application may invoke objects 102, 104, 106, which, by definition, means that only a single thread can cause changes to data 108, 112, 116. However, invoking methods associated with an object in an object calling hierarchy automatically causes locks to be obtained for all other invoked objects. This can use significant system resources, particularly for calling hierarchies containing many levels.

Consequently, in view of the need to protect data associated with objects in single threaded and multithreaded environments and the limitations in the prior approaches, an approach for synchronizing threads in a multithreaded environment which reduces the burden placed on system resources is highly desirable.

SUMMARY OF THE INVENTION

According to one aspect of the invention, a method is provided for protecting both first data associated with a first routine and second data associated with a second routine. The first routine causes a lock object to be locked to protect the first data. Then, the second routine causes the same lock object to be relocked to protect the second data while the lock object is locked to protect the first data.

According to another aspect of the invention, a method is provided for protecting data associated with a routine in a routine calling hierarchy. First, lock object data is provided to the routine. If the lock object data specifies a lock object, then the routine causes the specified lock object to be locked. On the other hand, if the lock object data specifies a predetermined value which indicates that no object locking is to be performed, then the routine does not cause any lock object to be locked.

According to another aspect of the invention, a computer system having a memory for protecting first data associated with a first routine and second data associated with a second routine is provided. The memory includes the first routine, the first data, the second routine, the second data and a lock object which can be locked by the first routine to protect the first data and which also can be relocked by the second routine to protect the second data while it is locked by the first routine to protect the first data.

According to another aspect of the invention, a computer data signal embodied in a carrier wave and representing a segment of instructions is provided for protecting both first data associated with a first routine and second data associated with a second routing. When executed by one or more processors, the sequence of instructions causes the first routine to cause a lock object to be locked to protect the first data. Then, the , second routine causes the same. lock object to be relocked to protect the second data while the lock object is locked to protect the first data.

BRIEF DESCRIPTION OF THE DRAWINGS

The invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
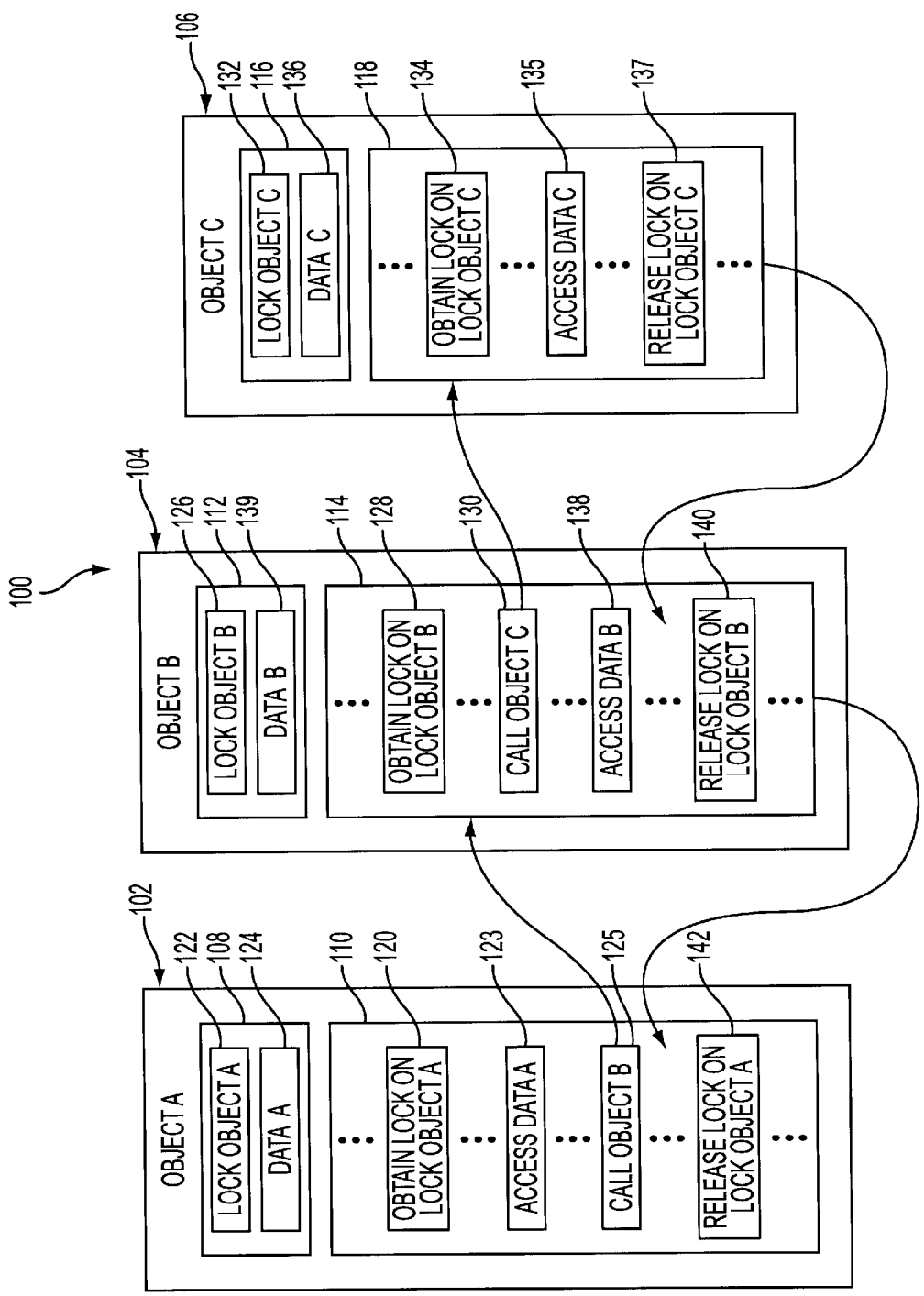
FIG. 1 is a block diagram illustrating a prior art object calling hierarchy.

A method and apparatus for synchronizing threads using selective object locking is described. In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

FUNCTIONAL OVERVIEW

A method and apparatus for synchronizing threads using selective object locking is described. Selective object locking refers to the ability for a thread to designate a lock object that will be used to synchronize an object.

According to an embodiment of the invention, a calling thread designates a lock object for an object at the time the thread invokes a constructor method to create the object. The lock object designated by the thread maybe any object. The same lock object may be designated for other objects in the object calling hierarchy which are invoked by the calling thread so that the designated lock object is reused. The ability to specify a lock object to be used to protect data associated with an object allows a series of objects invoked by a thread to use the same lock object.

Since the system resources and time required to perform a relock operation are less than the system resources and time required to perform a lock operation, this approach significantly reduces system overhead attributable to object locking.

In the following description, the phrase "invoking an object" refers to invoking a method associated with an object. Also, the phrase "locking an object" refers to obtaining a lock on a lock object to restrict access to data associated with an object, where the object containing the data may or may not be the same object as the lock object. Although embodiments of the invention are described hereinafter in the context of an object calling hierarchy, the invention is applicable to any type of routine calling hierarchy, regardless of the specific form or implementation of the routines.

DETAILED DESCRIPTION

The method and apparatus for synchronizing threads using selective object locking according to an embodiment of the invention is described hereinafter in the context of three approaches including, (1) the bottom up approach, (2) the top down approach, and (3) the optional locking approach.

1. Bottom Up Approach

In general, according to the bottom up approach, a lock object associated with a lower object in an object calling hierarchy is designated by a calling thread as the lock object. This approach is referred to as the bottom up approach because the lower level object is created first and the identity of the lower level object is provided to one or more higher level objects so that those higher level objects can later specify the lower level object as a lock object for the objects they invoke. After designating the lock object, the calling thread provides the identity of the designated lock object to the constructor methods of some other objects that will be invoked by the calling thread. Each synchronized method on these objects then obtains a lock on the designated lock object, instead of its own lock object. Essentially, several objects in the object calling hierarchy associated with a given thread obtain a lock on the designated lock object specified at the time they were constructed. All locks obtained on the designated lock object subsequent to the initial lock are relock operations, which require fewer system resources and are faster than a lock operation.

The bottom up approach is particularly useful in situations where a developer is building a library of object classes and data structures which are built up in many layers. That is, many designers start with simple object classes and then build higher level object classes whose methods invoke the methods of the more primitive object classes. Since a designer does not always know what the highest or outermost layer of all of the object classes will be, a designer, according to the bottom up approach, selects a lock object associated with a lower object in the calling hierarchy as the designated lock object. Although a lock object associated with a lower object in the calling chain is usually designated as the lock object, the lock object associated with any object in the object calling hierarchy may be designated as the lock object.

Figure 2:
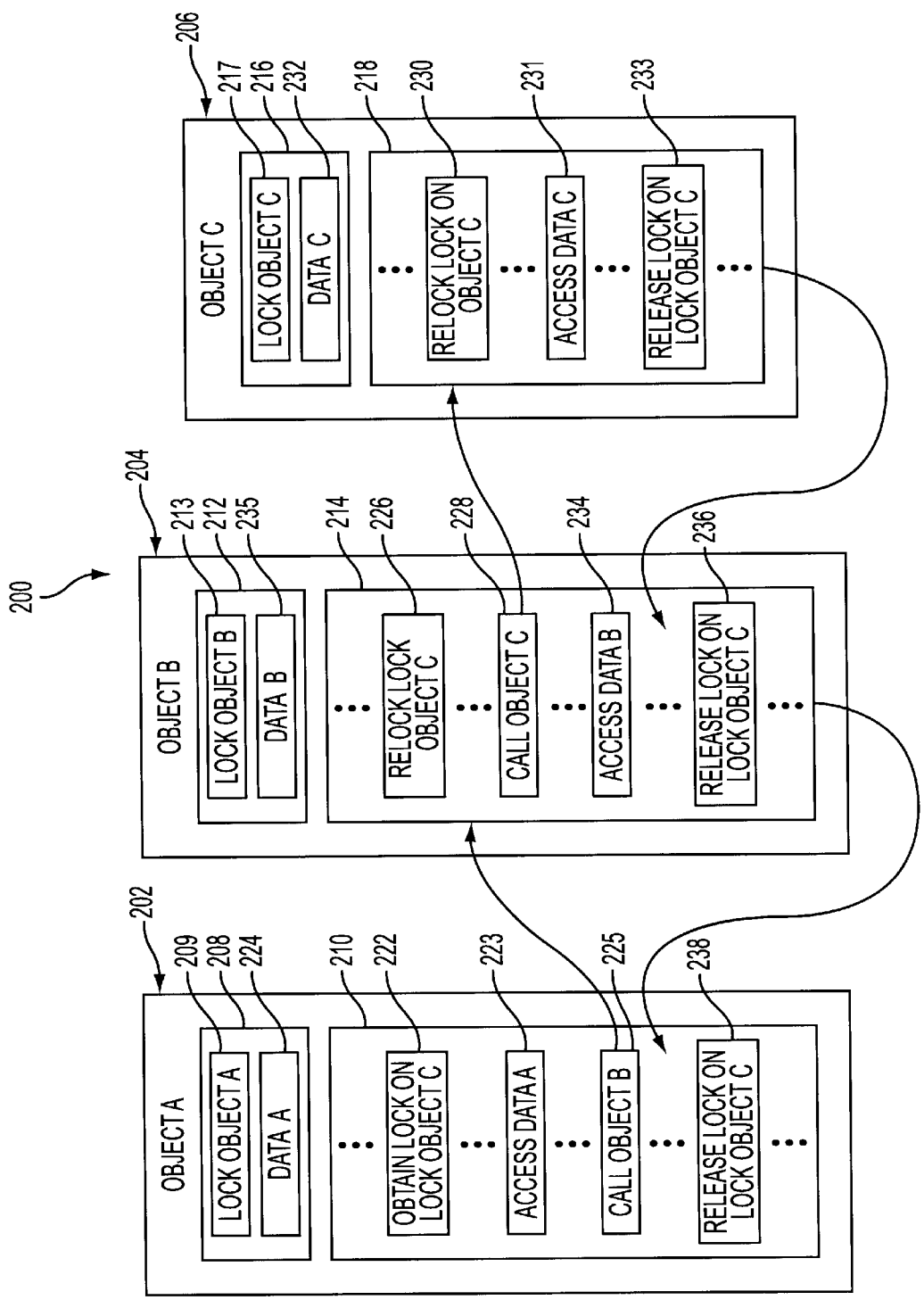
FIG. 2 is a block diagram illustrating an object calling hierarchy according to an embodiment of the invention.

The bottom up approach for providing explicit object locking according to an embodiment of the invention is now described with reference to FIG. 2. Object calling hierarchy 200 is similar to dynamic calling hierarchy 100 of FIG. 1 and includes object A 202, object B 204 and object C 206. Object A 202 includes data 208, such as variables and data structures associated with object A 202. Data 208 includes a lock object 209, associated with object A 202. Object A 202 also includes a method 210 which operates on data 208.

Object B 204 includes data 212, such as variables and data structures associated with object B 204. Data 208 includes a lock object 213, associated with object B 204. Object B 204 also includes a method 214 which operates on data 212.

Object C 206 includes data 216, such as variables and data structures associated with object C 206. Data 208 includes a lock object 209, associated with object C 206. Object C 206 also includes a method 218 which operates on data 216.

The calls made between objects 202, 204, 206 in object calling hierarchy 200 define a hierarchical relationship which makes object A 202 a "higher" level object relative to both object B 204 and object C 206, while object C 206 is a "lower" level object relative to both object B 204 and object C 206. On the other hand, object B 204 is a "lower" level object relative to object A 202, but is a "higher" level object relative to object C 206. This is because invoking object A 202 causes object B 204 to be invoked, which in turn, causes object C 206 to also be invoked as described in more detail hereinafter.

According to an embodiment of the invention, one of the lock objects 209, 213, 217 associated with object A 202, object B 204 and object C 206, respectively, is designated by as the lock object for objects 202, 204 and 206. Each object 202, 204, 206 in object calling hierarchy 200 is provided with access to the identity of the designated lock object at the time the object is constructed, and obtains a lock on the designated lock object when a synchronized method associated with the object is invoked. As other objects in object calling hierarchy 200 are invoked, those objects also obtain a lock on the designated lock object. Once the designated lock object has been locked by an object, all subsequent locks on the designated lock object are relock operations, which require significantly less overhead to process than an initial lock operation.

Figure 3A:
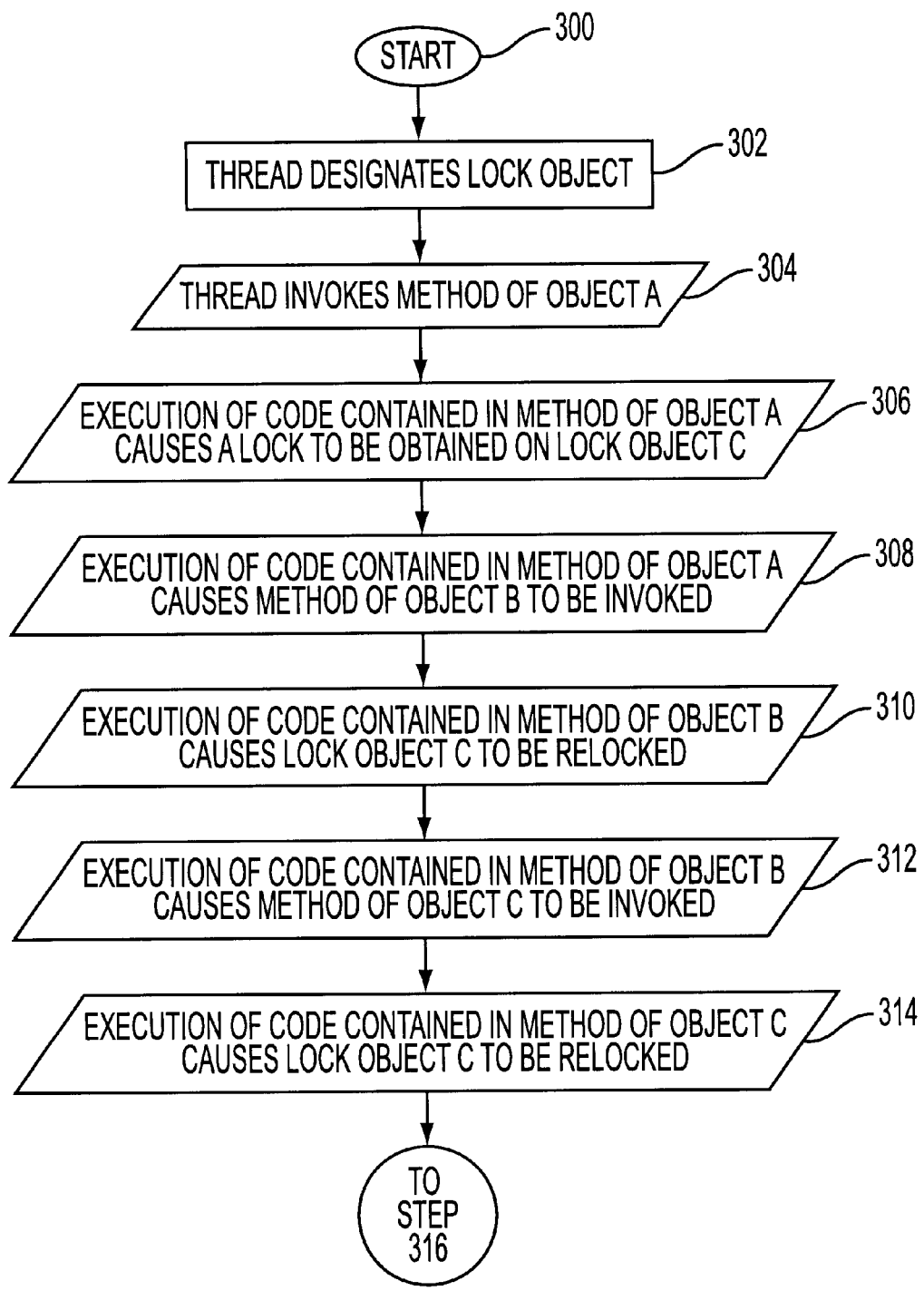
FIGS. 3A and 3B comprise a flow chart illustrating a method for protecting data associated with objects in a multithreaded environment according to an embodiment of the invention.
Figure 3B:
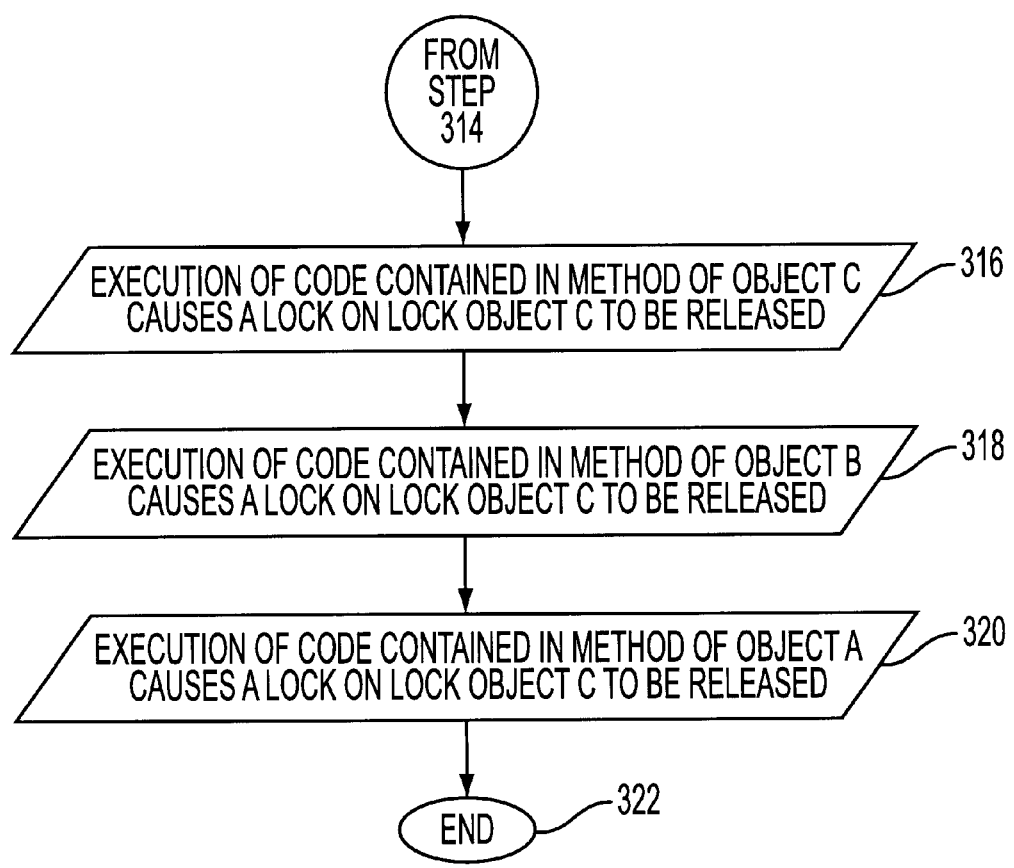

The specific steps involved in providing explicit object locking according to the bottom up approach is now described with reference to the block diagram of FIG. 2 and the flow chart of FIGS. 3A and 3B.

After starting in step 300, in step 302, a thread designates an object as a lock object during the construction of one or more objects. As previously discussed, the object designated as the lock object is typically associated with an object at a lower level in the object calling hierarchy. In the present example, the thread designates lock object C 217, associated with object C 206, as the lock object. In some situations, the object calling hierarchy may contain several objects which are all at the same relative level in the object calling hierarchy. In this case, the designation of the lock object is a matter of design choice.

In step 304, the thread invokes method 210 associated with object A 202. Then in step 306, execution of code 222 causes a lock to be obtained on the lock object designated for object A 202, which is lock object 217, associated with object C 206, which effectively locks object C 206. Once lock object C 217 has been locked, the thread which invoked method 210 has exclusive rights to cause changes to data 208. Other threads may be allowed to invoke method 210 since method 210 may contain other code prior to code 222. However, other threads cannot execute code 222 until the lock on lock object C 217 is released. Method 210 also includes code 223 which accesses data A 224 and which also cannot be executed by another thread until the lock on lock object 217 is released.

In step 308, execution of code 225 causes method 214 of object B 204 to be invoked. In the present example, code 225 includes a call containing information which specifies that lock object 217 is the lock object to be used by object B 204.

In step 310, code 226 causes lock object C 217 to be relocked since a lock has previously been acquired on lock object 217 by object A 202. As previously discussed, a relock operation requires fewer system resources and less time than a lock operation because much of the information which was required for the lock operation can be reused during the relock operation.

In step 312, execution of code 228 causes method 218 of object C 206 to be invoked. Code 228 includes a call containing information which specifies lock object C 217 as the lock object to be used by object C 206.

In step 314, the execution of code 230 causes lock object 217 to be relocked. Method 218 also includes code 231 which accesses data C 232.

In step 316, the execution of code 233 causes one lock on lock object C 217 held by object C 206 to be released and return control to method 214. Method 214 also includes code 234 which accesses data B 235 which cannot be executed by another thread until the lock on lock object 217 is released.

In step 318, execution of code 236 causes one lock on object lock C 217 held by object B 204 to be released and return control to method 210. Finally, in step 320, the execution of code 238 causes the lock on lock object C 217 held by object A 202 to be released.

As illustrated by this approach, once a thread invokes any of methods 210, 214, 218 in object calling hierarchy 200, lock object C 217 will be locked, which prevents another thread from causing changes to the data associated with the invoked object. In addition, since lock object C 217 is designated as the lock object to be used by objects 202, 204, 206, lock object C 217 is reused, which saves system resources and improves performance since relock operations are used instead of lock operations.

An example code implementation of the bottom up approach for synchronizing threads using selective object locking according to an embodiment of the invention is illustrated below. Although the code example may resemble the Java™ programming language by Sun Microsystems Inc., the example is merely for illustrative purposes and is not meant to be representative of an actual code implementation.

```
URL      u = . . . // code omitted;
InputStream is = u.getContents ( );
BufferedInputStream bis = new BufferedInputStream (is,is)
ThingieStream ts = new ThingieStream (bis,is)
Thingie t;
t = ts.read ( );
public class ThingieStream {
    public ThingieStream (InputStream is, Object lock) {
        this.input = is;
        this.lock = lock;
    }
    public Thingie read ( ) {
        synchronized (this.lock) {
            . . . this.input.read ( ) . . .
        }
    }
}
```

Although in the preceding description an object in the object calling hierarchy has been designated as the lock object, objects outside the object calling hierarchy may be designated as the lock object without departing from the scope of the invention.

In the above example, object A 202 and object B 204 are configured to specify, for the objects they invoke, the lock object that was specified for them. However, objects need not specify, for the lock objects they invoke, the lock object that was specified for them. For example, object D (not illustrated) may be specified as the lock object to be used by object A 202, even though object A 202 may specify lock object C 217 as the lock object to be used by object B 204.

2. Top Down Approach

Like the bottom up approach, the top down approach generally involves designating a lock object which is locked only once and then relocked by other invoked objects in an object calling hierarchy.

According to the top down approach, the calling thread designates a high level object as the lock object. For example, referring again to FIG. 2, a calling method (not illustrated) may designate its own lock object as the lock object and pass the identity of the designated lock object to object A 202. When method 210 is invoked, the identity of the designated lock object is then used by all objects 202, 204, 206 in object calling hierarchy 200 during synchronized execution of those objects. However, according to the top down approach, other objects, not specifically associated with the calling hierarchy, may be selected as the lock object.

The top down approach is particularly advantageous in situations when a developer builds programs which invoke methods associated with an object class library which already has implemented object level synchronization.

3. Optional Locking Approach

In situations where only one thread will be invoking an object, such as a single threaded application, thread synchronization is not necessary. However, object locking may be built-into an object library used by a single threaded application. In this situation, object locking is not necessary and wastes valuable system resources.

Since developers of object class libraries do not always know at the time a library is developed whether a library will only be used by single threaded applications or not, or that object locking will not be necessary for some other reason, thread synchronization is typically built-into the libraries. The alternative practice of providing duplicate libraries with and without object locking carries the risk that an application developer will inadvertently use an unsynchronized library with a multithreaded application and is therefore generally avoided. Consequently, the standard practice is to provide synchronized object class libraries with object locking.

According to the optional locking approach, the capability to specify whether or not object locking is to be used is provided. Avoiding object locking in situations where thread synchronization is not required eliminates the use of system resources which are normally attributable to locking objects and saves the time required to obtain a lock. In addition, in situations where lock objects are dynamically allocated for objects, the space normally required for the lock object is saved. Although the space saved for a single object may only be a few bytes of data, the savings in systems resources and time can be significant for applications using thousands or perhaps millions of objects.

According to the optional locking approach, an object locking parameter is included in each object constructor call. The object locking parameter specifies whether object locking should be used by the object and if so, which object should be locked. Specifically, the parameter either (1) specifies a lock object or (2) specifies a predetermined value which indicates that no object locking is to be performed.

When a lock object is specified, the synchronized methods of the object obtain a lock on the specified lock object. On the other hand, when the predetermined value which indicates that no object locking is to be performed is specified, then the invoked method does not perform any object locking. According to one embodiment of the invention, a NULL value is used as the predetermined value to specify no object locking. However, other predetermined values may be used without departing from the scope of the invention.

For example, referring again to FIG. 2, assume that method 210 is the constructor for object A 202. A calling thread invokes method 210 associated with object A 202 and includes an object locking parameter in the call which invokes method 210. The object locking parameter is evaluated by code 222 and the appropriate action taken depending upon the value.

In the first case, the lock object parameter specifies a lock object to be used by methods 210. In this case, code 222 causes a lock to be obtained on the lock object specified by the lock object parameter. According to the bottom up approach discussed above, the lock object parameter specifies lock object 217 associated with object C 206. On the other hand, according to the top down approach, the lock object parameter specifies a lock object associated with the calling method.

Instead of specifying a lock object, the object lock parameter may specify a predetermined value, such as a NULL value, so that no object locking is performed.

The optional locking approach provides the flexibility for a program to selectively specify the type of locking to be used on an object-by-object basis. The program may specify locking for some objects and no locking for other objects. For example, an application developer may know for a specific multithreaded application which objects may be used by only one thread. Using the optional locking approach, the application developer may specify that some objects be protected with object locking while other objects not be locked at all. Of course, specifying object locking for some objects and not for other objects carries the risk that the threads may not execute as planned or that additional threads may be added later, putting the data associated with the unprotected objects at risk.

Figure 4:
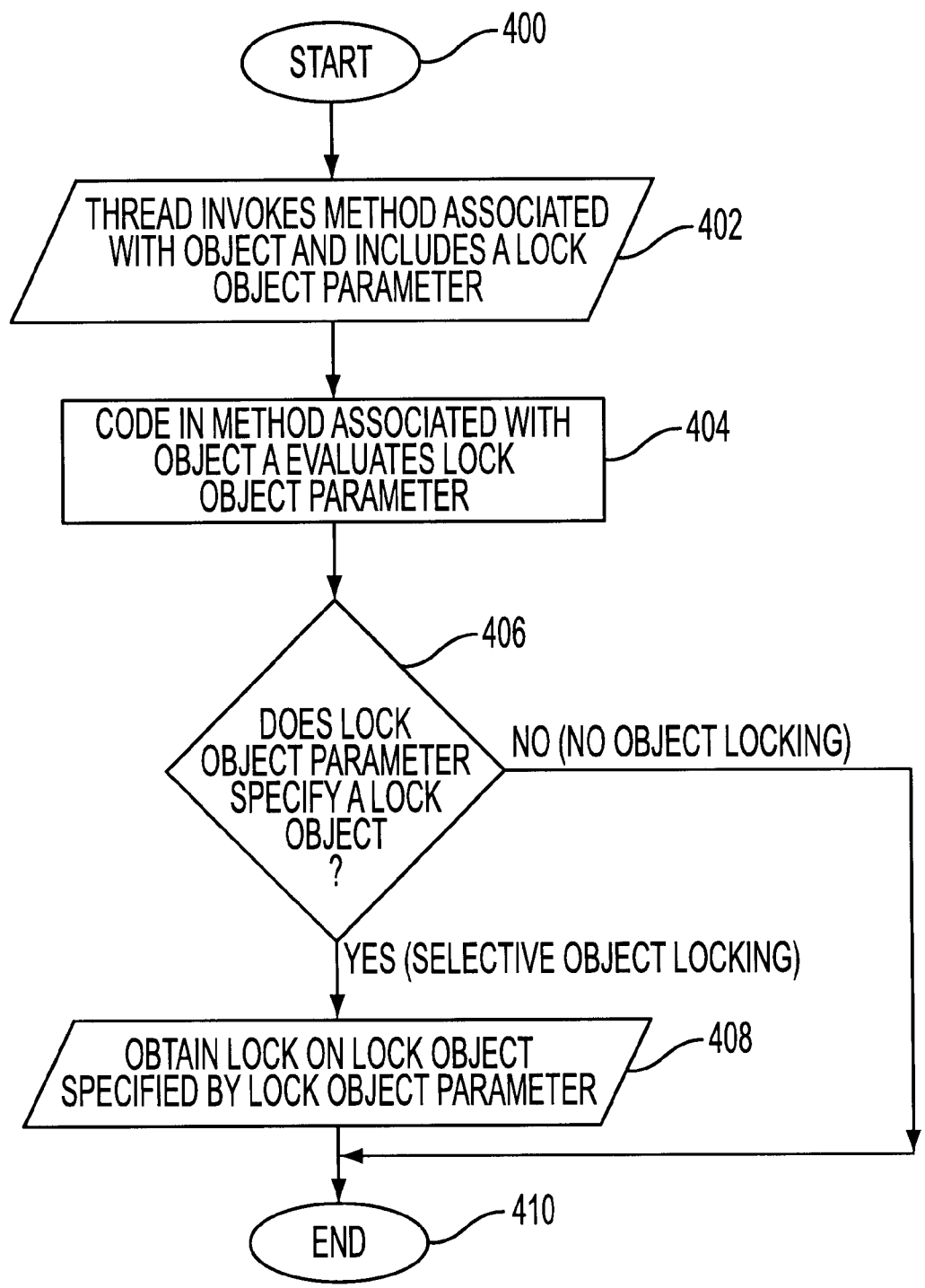
FIG. 4 is a flow chart illustrating a method for protecting data associated with objects in a multithreaded environment according to another embodiment of the invention.

The optional locking approach is now described with reference to the block diagram of FIG. 2 and the flow chart of FIG. 4. After starting in step 400, in step 402, a calling method invokes method 210 associated with object A 202. The invocation includes a lock object parameter. The lock object parameter specifies whether or not object locking is to be performed by object A 202, and if so, which object lock should be used.

In step 404, code 222 evaluates the lock object parameter provided by the calling method. In step 406, a determination is made by code 222 whether the lock object parameter specifies a lock object. If so, then in step 408, code 222 causes a lock to be obtained on the lock object specified by the lock object parameter. The lock object specified by the lock object parameter may be any object to be used as a lock object.

If, on the other hand, in step 406, the lock object parameter does not specify a lock object, then no object locking is performed and the process is completed in step 410. According to one embodiment of the invention, a NULL value is used to indicate that no object locking should be performed. However, other predetermined values may also be used without departing from the scope of the invention.

An example code implementation of the optional locking approach according to an embodiment of the invention is illustrated below. The example is merely for illustrative purposes and is not meant to be representative of a complete code implementation.

```
private object lock;
public void insert (object) {
    if(lock == NULL) {<work>}
    else    synchronized (lock) {<work>}
}
```

This code example illustrates that according to the optional locking approach, an object lock parameter may be passed to invoked objects and then tested by the methods associated with those objects to determine whether object locking should be performed.

Although embodiments of the invention have been described in the context of designating a lock object during the creation (construction) of an object, the designation of a lock object may be deferred until a later time. For example, the designation of a lock object may be made at the time an object is invoked, and may be determined internally or externally to the object. The lock object can then be managed by the object itself or managed external to the object.

HARDWARE OVERVIEW

Figure 5:
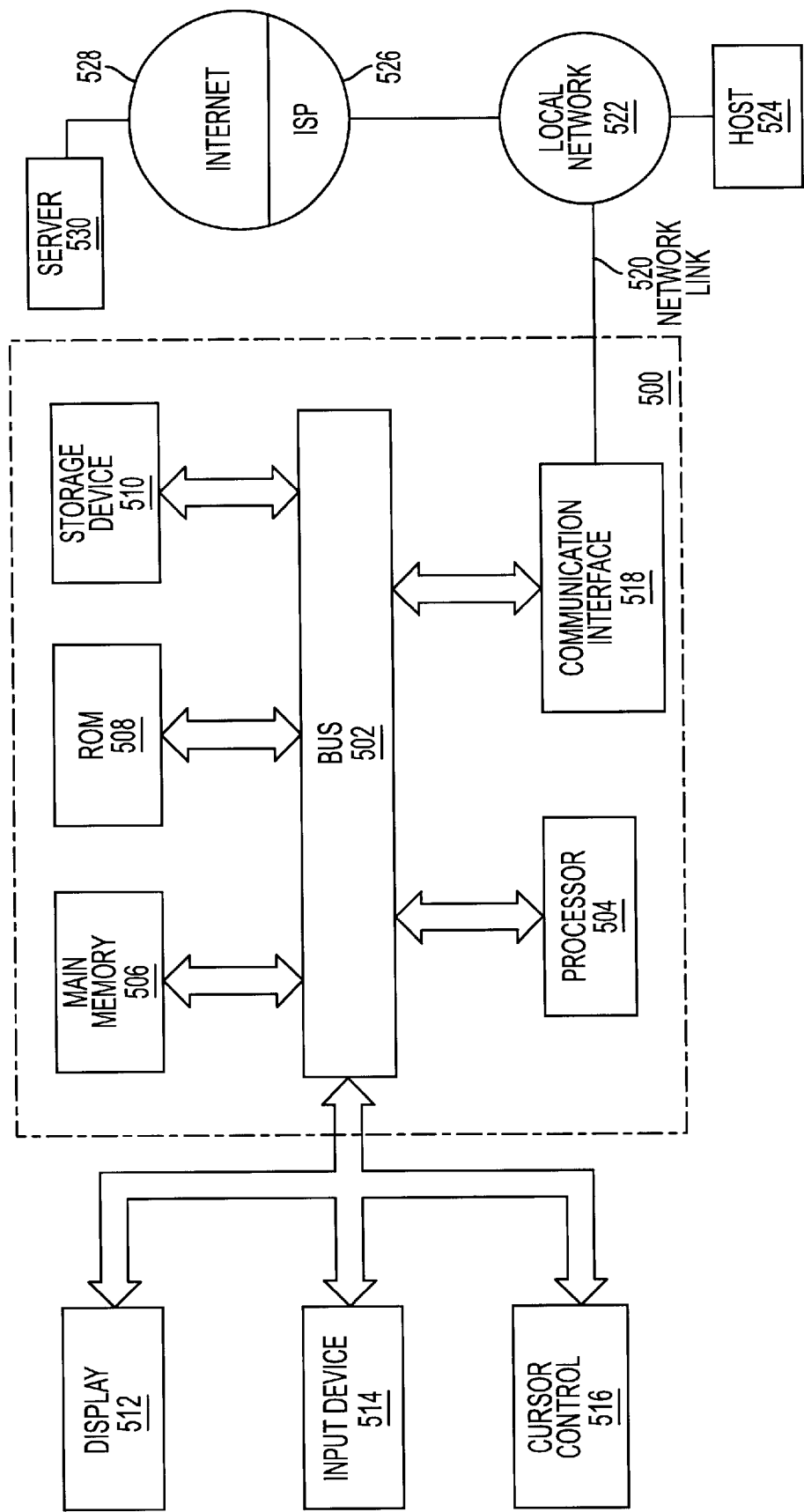
FIG. 5 is a block diagram of a computer system on which the invention may be implemented.

FIG. 5 is a block diagram which illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 also includes a read only memory (ROM) 508 or other static storage device coupled to bus 502 for storing static information and instructions for processor 504. A storage device 510, such as a magnetic disk or optical disk, is also provide and coupled to bus 502 for storing information and instructions.

Computer system 500 may also be coupled via bus 502 to a display 512, such as a cathode ray tube (CRT), for displaying information to a computer user. An input device 514, including alphanumeric and other keys, is also provided and coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), which allows the device to specify positions in a plane.

The invention is related to the use of computer system 500 to synchronize threads via selective object locking. According to one embodiment of the invention, synchronization of threads via selective object locking is provided by computer system 500 in response to processor 504 executing sequences of instructions contained in main memory 506. Such instructions may be read into main memory 506 from another computer-readable medium, such as storage device 510. However, the computer-readable medium is not limited to devices such as storage device 510. For example, the computer-readable medium may include a floppy disk, a flexible disk, hard disk, magnetic tape, or any other magnetic medium, a CD-ROM, any other optical medium, a RAM, a PROM, and EPROM, a FLASHEPROM, any other memory chip or cartridge, or any other medium from which a computer can read. Execution of the sequences of instructions contained in main memory 506 causes processor 504 to perform the process steps previously described. In alternative embodiments, hard-wired circuitry may be used in place of or in combination with software instructions to implement the invention. Thus, embodiments of the invention are not limited to any specific combination of hardware circuitry and software.

Computer 500 also includes a communication interface 518 coupled to bus 502. Communication interface 508 provides a two-way data communication coupling to a network link 520 to a local network 522. For example, if communication interface 518 is an integrated services digital network (ISDN) card or a modem, communication interface 518 provides a data communication connection to the corresponding type of telephone line. If communication interface 518 is a local area network (LAN) card, communication interface 518 provides a data communication connection to a compatible LAN. Wireless links are also possible. In any such implementation, communication interface 518 sends and receives electrical, electromagnetic or optical signals which carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals which carry digital data streams. The signals through the various networks and the signals on network link 520 and through communication interface 518, which carry the digital data to and from computer 500 are exemplary forms of carrier waves transporting the information.

Computer 500 can send messages and receive data, including program code, through the network(s), network link 520 and communication interface 518. In the Internet example, a server 530 might transmit a requested code for an application program through Internet 528, ISP 526, local network 522 and communication interface 518. In accord with the invention, one such downloaded application provides for the synchronization of threads using selective object locking as described herein.

The received code may be executed by processor 504 as it is received, and/or stored in storage device 510, or other non-volatile storage for later execution. In this manner, computer 500 may obtain application code in the form of a carrier wave.

The invention provides several advantages over prior approaches for synchronizing threads so that commonly accessible data may not be accessed simultaneously by more than one thread. Specifically, the invention provides the capability for a calling thread to designate a lock object to be used by one or more objects in an object calling hierarchy which are invoked by the thread. An important benefit of this capability is that significantly fewer system resources are required to perform a relock operation once the initial lock has been obtained. It also takes less time to relock a lock object than to lock a lock object. In addition, for single thread applications, or other situations where object locking is not necessary, the invention provides the flexibility to override object locking on an object-by-object basis. In addition to saving system resources from a processing standpoint, in some systems, this avoids the allocation of lock objects to each invoked object.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for protecting data associated with a first routine when access to said data by a second routine is desired, the method comprising the steps of:
    a) causing a lock object to be locked to protect the first data; and
    b) to cause the lock object to be relocked indicating to the lock object when the second routine needs to access said data by relocking the lock object.

2. The method of claim 1, further including the step of the first routine invoking the second routine.

3. The method of claim 1, further including the step of designating an object associated with the first routine as the lock object.

4. The method of claim 1, further including the step of designating an object associated with the second routine as the lock object.

5. The method of claim 1, further including the steps of
    a) a third routine providing a lock object parameter to the second routine,
    b) if the lock object parameter specifies a lock object, then the second routine causing the lock object specified by the lock object parameter to be locked, and
    c) if the lock object parameter specifies that no object locking is to be performed, then the second routine not causing any lock object to be locked.

6. The method of claim 1, wherein the first routine is a first method associated with a first object,
    wherein the second routine is a second method associated with a second object,
    wherein the step of the first routine causing a lock object to be locked to protect the first data further comprises the step of the first method causing a lock object to be locked to protect the first data, and
    wherein the step of the second routine causing the lock object to be relocked further comprises the step of the second method causing the lock object to be relocked to protect the second data.

7. The method of claim 6, further including the step of the first method invoking the second method.

8. The method of claim 6, further including the step of designating an object associated with the first method as the lock object.

9. The method of claim 6, further including the step of designating an object associated with the second method as the lock object.

10. A method for selectively protecting data associated with a routine in a calling hierarchy, the method comprising the steps of:
    a) receiving parameter data which indicates whether a lock is to be used to control access to the data;
    b) if the parameter data indicates that a lock is to be used to control access to the data, then obtaining a lock that controls access to the data, the lock being obtained prior to accessing the data; and
    c) if the parameter data indicates that locking is not to be used to control access to the data, then not obtaining a lock that controls access to the data.

11. The method of claim 10, wherein the parameter data specifies that a lock is to be used to control access to the data by specifying a lock object,
    wherein the method further includes the step of if the parameter data specifies a lock object, then obtaining a lock on the specified lock object to control access to the data, wherein the parameter data specifies that a lock is not to be used to control access to the data by specifying a predetermined value, and wherein the method further includes the step of if the parameter data specifies a predetermined value, then not obtaining a lock to control access to the data.

12. The method of claim 10, wherein the routine is a first routine and the method further includes the step of a second routine invoking the first routine.

13. The method of claim 10, wherein the routine calling hierarchy is an object calling hierarchy, wherein the routine is a method associated with an object in the object calling hierarchy, wherein the data is associated with the object in the object calling hierarchy, and wherein the step of receiving parameter data which indicates whether a lock is to be used to control access to the data further comprises the step of the method associated with the routine in the calling hierarchy receiving parameter data which indicates whether a lock is to be used to control access to the data.

14. A computer system having a memory for protecting first data associated with a first routine and second data associated with a second routine, the memory comprising:

a) the first routine;
b) the first data;
c) the second routine;
d) the second data; and
e) a lock object which can be locked by the first routine to protect the first data and which can also be relocked by the second routine to protect the second data while the lock object is locked to protect the first data.

15. The computer system of claim 14, wherein the lock object is associated with the second routine.

16. A computer-readable medium having stored thereon a plurality of sequences of instructions for protecting both first data associated with a first routine and second data associated with a second routine, the plurality of sequences of instructions including sequences of instructions which, when executed by one or more processors, cause the one or more processors to perform the steps of:

a) the first routine causing a lock object to be locked to protect the first data; and
b) the second routine causing the lock object to be relocked to protect the second data.

17. The computer-readable medium of claim 16, wherein the computer-readable medium further includes instructions for performing the step of the first routine invoking the second routine.

18. The computer-readable medium of claim 16, wherein the computer-readable medium further includes instructions for performing the step of designating an object associated with the first routine as the lock object.

19. The computer-readable medium of claim 16, wherein the computer-readable medium further includes instructions for performing the step of designating an object associated with the first routine as the lock object.

20. The computer-readable medium of claim 16, wherein the computer-readable medium further includes instructions for performing the steps of a) a third routine providing a lock object parameter to the second routine,
b) if the lock object parameter specifies a lock object, then the second routine causing the lock object specified by the lock object parameter to be locked, and
c) if the lock object parameter specifies that no object locking is to be performed, then the second routine not causing any lock object to be locked.

21. The computer-readable medium of claim 16, wherein the first routine is a first method associated with a first object, wherein the second routine is a second method associated with a second object, wherein the step of the first routine causing a lock object to be locked to protect the first data further comprises the step of the first method causing a lock object to be locked to protect the first data, and wherein the step of the second routine causing the lock object to be relocked further comprises the step of the second method causing the lock object to be relocked to protect the second data.

22. The computer-readable medium of claim 21, wherein the computer-readable medium further includes instructions for performing the step of the first method invoking the second method.

23. The computer-readable medium of claim 21, wherein the computer-readable medium further includes instructions for performing the step of designating an object associated with the first method as the lock object.

24. The computer-readable medium of claim 21, wherein the computer-readable medium further includes instructions for performing the step of designating an object associated with the second method as the lock object.

25. A computer data signal embodied in a carrier wave and representing a sequence of instructions which, when executed by one or more processors, causes the one or more processors to provide for protecting both first data associated with a first routine and second data associated with a second routine by performing the steps of:

a) the first routine causing a lock object to be locked to protect the first data; and
b) the second routine causing the lock object to be relocked to protect the second data.

26. The computer data signal of claim 25, wherein the sequence of instructions further includes instructions for performing the step of the first routine invoking the second routine.

27. The computer data signal of claim 25, wherein the sequence of instructions further includes instructions for performing the step of designating an object associated with the first routine as the lock object.

28. The computer data signal of claim 25, wherein the sequence of instructions further includes instructions for performing the step of designating an object associated with the first routine as the lock object.

29. The computer data signal of claim 25, wherein the sequence of instructions further includes instructions for performing the steps of a) a third routine providing a lock object parameter to the second routine,
b) if the lock object parameter specifies a lock object, then the second routine causing the lock object specified by the lock object parameter to be locked, and
c) if the lock object parameter specifies that no object locking is to be performed, then the second routine not causing any lock object to be locked.

30. The computer data signal of claim 25, wherein the first routine is a first method associated with a first object, wherein the second routine is a second method associated with a second object, wherein the step of the first routine causing a lock object to be locked to protect the first data further comprises the step of the first method causing a lock object to be locked to protect the first data, and wherein the step of the second routine causing the lock object to be relocked further comprises the step of the second method causing the lock object to be relocked to protect the second data.

31. The computer data signal of claim 30, wherein the sequence of instructions further includes instructions for performing the step of the first method invoking the second method.

32. The computer data signal of claim 30, wherein the sequence of instructions further includes instructions for performing the step of designating an object associated with the first method as the lock object.

33. The computer data signal of claim 30, wherein the sequence of instructions further includes instructions for performing the step of designating an object associated with the second method as the lock object.

* * * * *